(12) United States Patent
Brancato et al.

(10) Patent No.: US 12,363,139 B2
(45) Date of Patent: Jul. 15, 2025

(54) EVENT STREAM-BASED THREAT DETECTION

(71) Applicant: AppOmni, Inc., San Francisco, CA (US)

(72) Inventors: Michael Brancato, Lexington, KY (US); Drew Gatchell, Berryville, VA (US)

(73) Assignee: AppOmni, Inc., San Francisco, CA (US)

( * ) Notice: Subject to any disclaimer, the term of this patent is extended or adjusted under 35 U.S.C. 154(b) by 596 days.

(21) Appl. No.: 17/700,004

(22) Filed: Mar. 21, 2022

(65) Prior Publication Data
US 2023/0300152 A1   Sep. 21, 2023

(51) Int. Cl.
*H04L 9/40* (2022.01)
(52) U.S. Cl.
CPC ...... *H04L 63/1416* (2013.01); *H04L 63/1425* (2013.01)

(58) Field of Classification Search
CPC . H04L 63/1416; H04L 63/1425; H04L 43/16; H04L 41/064
See application file for complete search history.

(56) References Cited

U.S. PATENT DOCUMENTS

| 6,507,852 | B1 * | 1/2003 | Dempsey | G06F 16/2358 |
| 10,764,315 | B1 * | 9/2020 | Carroll | H04L 12/4625 |
| 11,080,307 | B1 * | 8/2021 | Holub | G06F 16/285 |
| 2017/0228391 | A1 * | 8/2017 | Savla | G06F 12/0871 |

* cited by examiner

*Primary Examiner* — Abdulkader M Alriyashi
(74) *Attorney, Agent, or Firm* — Van Pelt, Yi & James LLP

(57) ABSTRACT

Event stream-based threat detection is disclosed, including: determining that an event from a stream of events is an influencing event by comparing the event to an alert rule; storing a new cache entry associated with the influencing event in a detection cache, wherein the new cache entry includes a fingerprint associated with the influencing event; querying the detection cache using at least the fingerprint associated with the new cache entry for a set of related cache entries; and determining whether to generate an alert based at least in part on the set of related cache entries and the alert rule.

19 Claims, 12 Drawing Sheets

EVENT STREAM-BASED THREAT DETECTION

BACKGROUND OF THE INVENTION

Most intrusion detection systems (IDS) provide alerts by looking at a single event, operation, or network packet. This is often paired with security information and event management (SIEM) systems. A SIEM will have a backend data store which is used to persist and index the event data, making it searchable. The SIEM's alerting functionality leverages the indexed data store, by constantly querying the index, or querying the index on an event-driven or time-driven basis.

BRIEF DESCRIPTION OF THE DRAWINGS

Various embodiments of the invention are disclosed in the following detailed description and the accompanying drawings.

DETAILED DESCRIPTION

Figure 1:
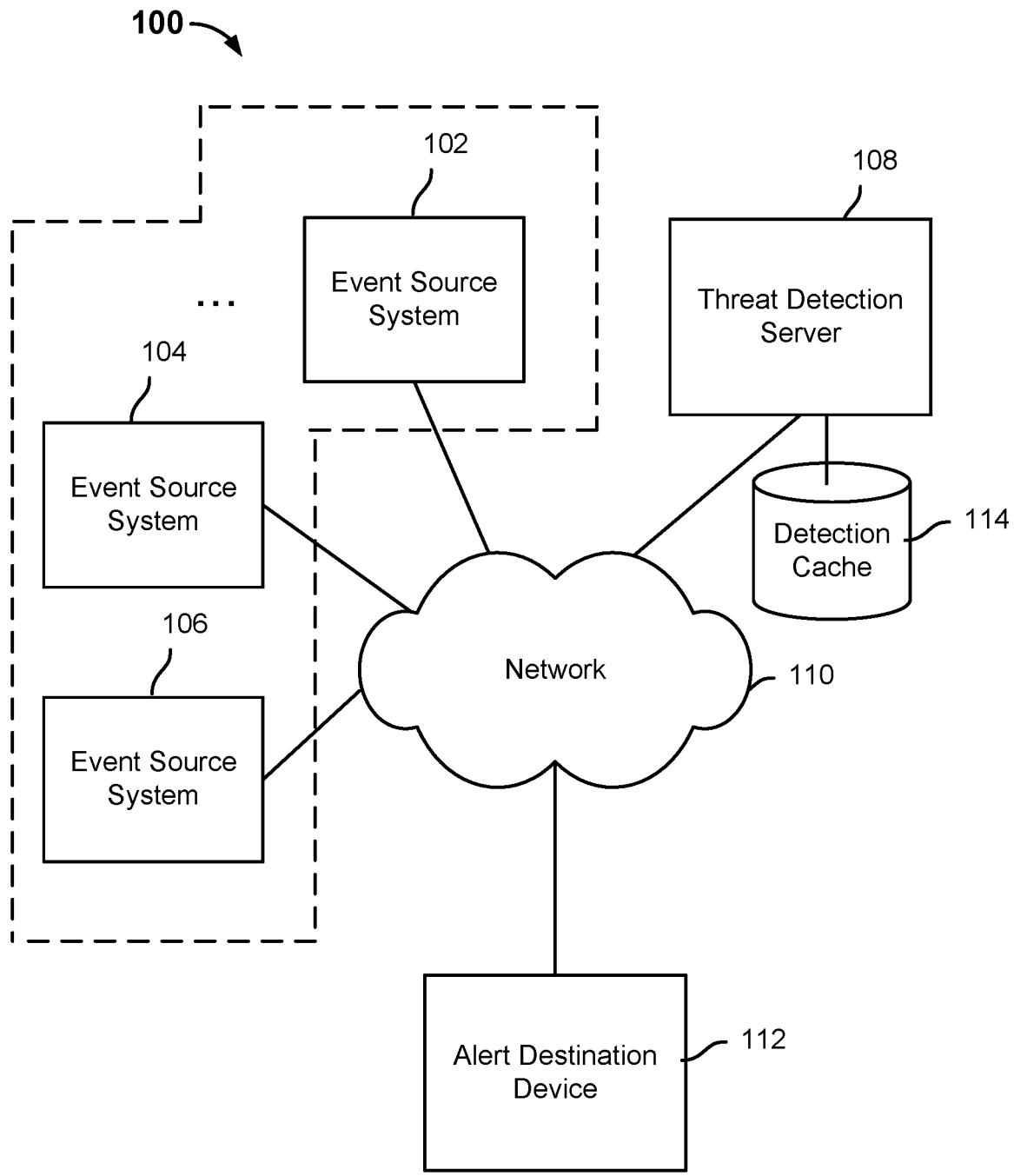
FIG. 1 is a diagram showing an embodiment of a system for event stream-based threat detection.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of event stream-based threat detection are described herein. An event from a stream of events is determined to be an influencing event by comparing the event to an alert rule. In some embodiments, the event comprises a security event that includes an event timestamp and fields that describe the event. In some embodiments, the event is obtained from an event source system such as a software as a service (SaaS) platform. In some embodiments, the alert rule specifies at least a first condition for determining when an event qualifies as an influencing event. A new cache entry associated with the influencing event is stored in a detection cache. The new cache entry includes a fingerprint associated with the influencing event. As will be described below, in some embodiments, the fingerprint comprises a combination of a hash of at least a unique rule identifier and some fields selected from the influencing event and the event timestamp associated with the influencing event. As will be described below, in some embodiments, the cache entry may include an optional distinct fingerprint from a unique rule identifier and some fields selected from the influencing event to create mutual exclusivity by field values. As will be described below, in various embodiments, the cache entry may include related information (e.g., target users or source computer) from the influencing event to be later included in alerts generated. While the lightweight new cache entry that represents the influencing event is stored in the detection cache, the underlying data of the influencing event itself is not stored. The detection cache is queried using at least the fingerprint associated with the new cache entry for a set of related cache entries. In some embodiments, the set of related cache entries is determined to each include a matching fingerprint relative to the fingerprint of the new cache entry. If the set of related cache entries is queried after the new cache entry is stored in the detection cache, then the set of related cache entries includes the new cache entry. Each related cache entry of the set represents a processed influencing event that is related to the same alert rule. Whether an alert should be generated is determined based at least in part on the set of related cache entries (which includes the new cache entry) and the alert rule. In some embodiments, the set of related cache entries is compared against a second condition for generating an alert that is specified in the alert rule. As such, multiple related cache entries (e.g., related by sharing a common fingerprint) that represent multiple respective (e.g., security) events (e.g., that were generated and/or processed at different points in time) can be evaluated together to determine whether a condition for generating an alert is met.

FIG. 1 is a diagram showing an embodiment of a system for event stream-based threat detection. System 100 includes event source system 102, event source system 104, event source system 106, threat detection server 108, detection cache 114, network 110, and alert destination device 112. Network 110 may be implemented using data networks and/or telecommunication networks. Event source system 102, event source system 104, event source system 106, threat detection server 108, and alert destination device 112 may communicate to each other over network 110.

Each of event source systems 102, 104, and 106 is configured to provide a respective service and also generate events that document activities (e.g., user activity, a telemetric reading, or a sensed value) that occur with respect to their services/function. In various embodiments, each event includes one or more of the following: an event timestamp associated with when a corresponding activity occurred and/or when the event was generated, a unique identifier for the event, a field that identifies one or more users associated with the activity, a field that identifies an organization associated with the activity, and one or more fields that describe attributes of the activity. In various embodiments, at least some of event source systems 102, 104, and 106 are associated with a different SaaS platform or an instrument for measuring information. Examples of services provided by SaaS platforms include workflow management, file storing, file sharing, customer relationship management, payroll management, employee data management, human resource data management, and financial management. For example, organizations such as enterprises may subscribe to services provided by one or more SaaS platforms to help manage their businesses. As activities are performed by users (e.g., employees, contractors, customers, and/or guests) associated with an organization that subscribes to the services provided by an event source system (e.g., such as one of event source systems 102, 104, and 106), the event source system is configured to generate corresponding events that document such activities.

Threat detection server 108 is configured to obtain the events from the streams of events that are generated by one or more event source systems (e.g., such as one of event source systems 102, 104, and 106) for one or more organizations and determine whether to generate a corresponding cache entry for each event. In the first stage (which is sometimes referred to as the "condition evaluation" stage) of a two-stage process for alerting, threat detection server 108 is configured to compare an obtained event against each alert rule of a set of alert rules to determine whether fields of the event match a set of logical event conditions (which are sometimes referred to as "detection conditions") that are specified in the alert rule. In various embodiments, the first stage is a process for which an event is evaluated to determine if the event matches the detection conditions in the alert rule (which is sometimes referred to as an "influencing event") and therefore, for which a corresponding detection cache entry should be created (which is sometimes referred to as a "cache entry generation") and stored in detection cache 114. In various embodiments, an "influencing event" is an event that may eventually lead to an alert being generated by threat detection server 108. If the obtained event matches a rule's detection conditions, threat detection server 108 is configured to generate a new detection cache entry corresponding to that influencing event and to store that cache entry in detection cache 114. As will be described in further detail below, in various embodiments, threat detection server 108 is configured to include in the detection cache entry at least the event timestamp of an influencing event and a fingerprint that is generated based on the alert rule and at least some fields of the influencing event so that the cache entry represents the unique event correlated with the alert rule. Threat detection server 108 then stores this representative, lightweight cache entry in detection cache 114 to represent the influencing event in lieu of storing the entire data associated with the event.

In the second stage (which is sometimes referred to as the "cache query" stage) of the two-stage process for alerting, threat detection server 108 is configured to query detection cache 114 to search and retrieve a set of detection cache entries related to the new detection cache entry that had been generated to represent the influencing event. In various embodiments, threat detection server 108 is configured to use the fingerprint of the new detection cache entry to search detection cache 114 to retrieve zero or more detection cache entries that share the same fingerprint as the new detection cache entry. In some embodiments, threat detection server 108 is configured to query detection cache 114 for related detection cache entries within a timeframe (that is specified by the alert rule) relative to the event timestamp of the new detection cache entry. The cache entries that share the same fingerprint as the new detection cache entry are referred to as "related cache entries" or "related detection cache entries." In various embodiments, threat detection server 108 is configured to evaluate the set of related cache entries with the new detection cache entry against additional conditions of the alert rule. In various embodiments, the additional conditions (which is sometimes referred to as an "alert generation conditions") are conditions such that if the collection of the set of related detection cache entries with the new detection cache entry matches those conditions, then threat detection server 108 is configured to generate a corresponding alert. For example, the alert indicates a likelihood of undesirable security activity for which further investigation or remedial action should be taken. In some embodiments, within a defined timeframe (which is sometimes referred to as a "timeframe condition"), a required number (which is sometimes referred to as a "threshold condition") of influencing events should occur, referenced as cache entries generated based on the same alert rule and containing the same fingerprint, before a new alert should be sent to a corresponding alert destination device. In some embodiments, threat detection server 108 is configured to determine whether to send the generated alert to alert destination device 112 based on the "cooldown period criteria." In some embodiments, the "cooldown period criteria" describes the minimum length of time that should elapse between alerts generated based on the same alert rule and fingerprint (e.g., and related to the same user and/or organization) before a new alert should be sent to a corresponding alert destination device (e.g., associated with repeated, alert-generating actions so that the alert receiver is not repeatedly notified of the same alert within a short window of time). In some embodiments, threat detection server 108 is configured to determine whether to send the generated alert to alert destination device 112 based on whether the alert rule specifies that the alert should be sent to alert destination device 112 or merely noted in detection cache 114 as a corresponding detection cache entry. For example, as will be described in further detail below, where the alert rule is a "building block rule" and is referenced in an ordered list of alert rules that is specified by some "sequence rule," an alert that is generated in relation to matching the alert generation conditions of a "building block rule" may be configured to not send an alert to the destination device and instead, an alert pertaining to the sequence rule is later generated and sent if each building block rule within the ordered list of the sequence rule is determined by threat detection server 108 to have occurred and match the alert generation conditions of the sequence rule.

In the event that threat detection server 108 had generated an alert corresponding to the alert rule (e.g., where the alert rule is a "building block rule"), the threat detection server 108 is configured to generate a new detection cache entry corresponding to the generated alert. In various embodiments, the new detection cache entry corresponding to the generated alert includes one or more of the following: an alert timestamp (e.g., the time at which the alert was generated), the fingerprint associated with the related detection cache entries, and related information from the influencing events that led to the generation of the alert, and the unique identifiers of the influencing events. In some embodiments, as mentioned above, the new detection cache entry corresponding to the generated alert is stored in detection cache 114 so that it can be searched to determine whether it and a set of subsequently generated alerts corresponding to various alert rules should generate a new "sequence rule" alert to be sent to the destination device given the generated alerts match conditions of a "sequence rule," which requires an ordered list of "building block rule" alerts generated and stored in the cache, cooldown period criteria, and timeframe criteria, having all been met.

Various embodiments of event stream-based threat detection described herein provide many advantages over both conventional intrusion detection systems (IDS) and security information and event management (STEM) alerting systems. By evaluating events as they arrive, various embodiments described herein can provide real-time alerts for conditions dependent on multiple, discrete events. The threat detection server 108 may obtain the stream of events from event source systems by having events push to and/or polling the event source system for events periodically. It is not uncommon for events generated by one or more event source systems to be out of order relative to the events' respective event timestamps. However, because alert generation according to various embodiments described herein considers a queried set of related detection cache entries associated with a specified timeframe, related events can be identified even if they arrive late or out of order relative to their respective event timestamps. Furthermore, various embodiments of stream-based threat detection as described herein do not rely on storing the entire data of obtained events, and instead generate and store a significantly more lightweight fingerprint that represents each influencing event in the detection cache. As such, various embodiments of stream-based threat detection as described herein can process and consider a large volume of events using significantly reduced storage space as compared to conventional detection or intrusion alerting systems that rely on storing the entire event data.

While FIG. 1 shows one instance of threat detection server 108, in actual implementation, more than one instance of threat detection server 108 (e.g., located in different geographic locations) can be used. In the event that more than one instance of threat detection server 108 is used, in some embodiments, the multiple instances of threat detection server 108 can share one instance of detection cache 114. In some embodiments, detection cache 114 may be distributed, sharded, or scaled horizontally as long as it retains its strongly consistent property. Detection cache 114 should be strongly consistent so that any time that it is queried, it will return non-expired cache entries pertaining to all events that have been previously processed by any instance of a threat detection server 108. While FIG. 1 shows detection cache 114 being located local (e.g., not connected over a network) relative to threat detection server 108, in actual implementation, detection cache 114 can be located remote (e.g., connected over a network such as network 110) relative to threat detection server 108.

Figure 2:
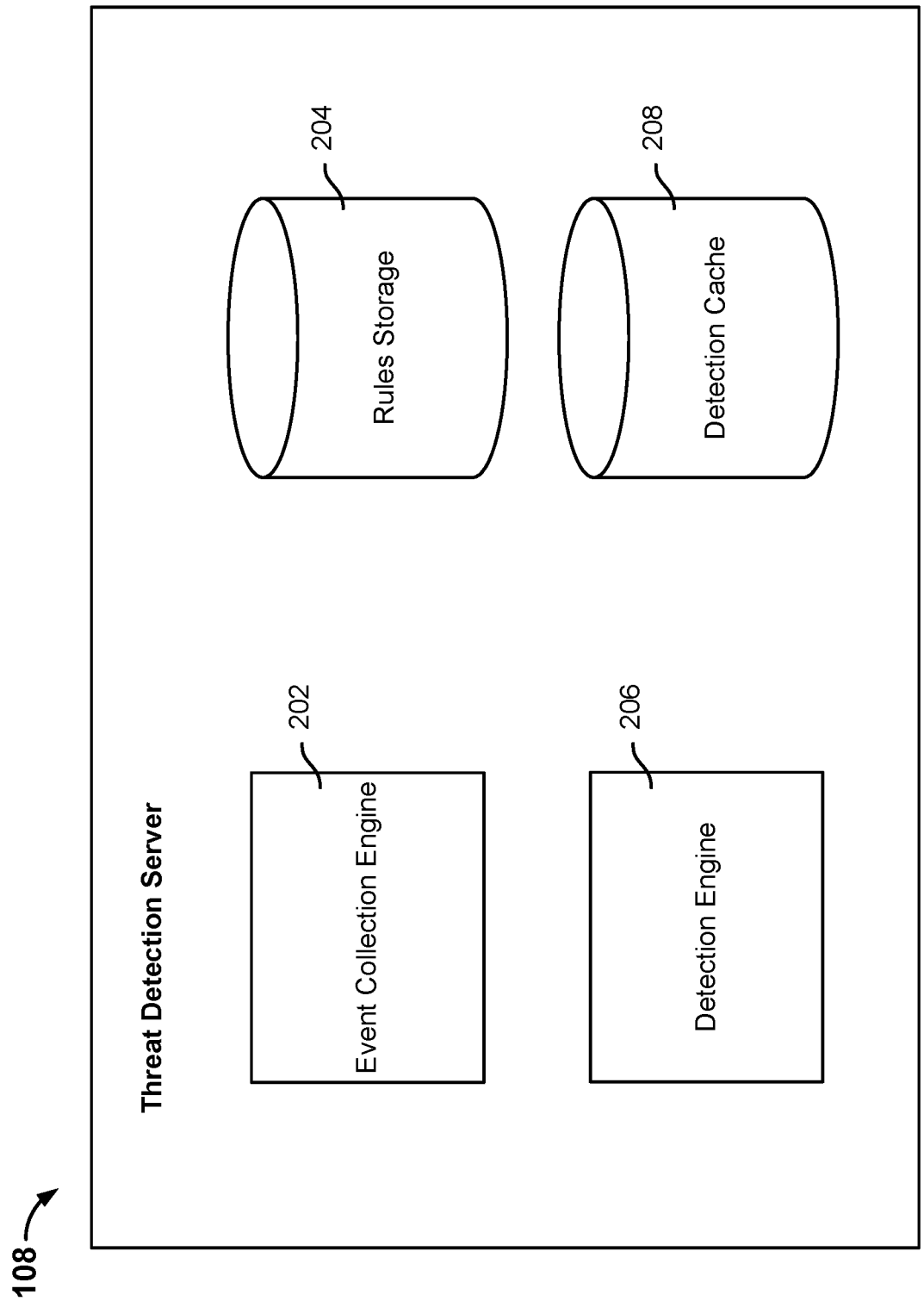
FIG. 2 is a diagram showing an example of a threat detection server.

FIG. 2 is a diagram showing an example of a threat detection server. In some embodiments, threat detection server 108 of system 100 of FIG. 1 can be implemented using the example threat detection server of FIG. 2. The example threat detection server includes event collection engine 202, rules storage 204, detection engine 206, and detection cache 208. Each of event collection engine 202 and detection engine 206 may be implemented using hardware (e.g., a processor) and/or software. Each of rules storage 204 and detection cache 208 may be implemented using a database or any type of storage medium so long as it meets all other criteria for the detection cache. In some embodiments, detection cache 114 of system 100 of FIG. 1 may be implemented using detection cache 208 of FIG. 2.

Event collection engine 202 is configured to collect a stream of events from one or more event source systems (e.g., associated with SaaS platforms). In some embodiments, event collection engine 202 is configured to poll the event source system(s) for events. In some embodiments, the event source system(s) are configured to push events to event collection engine 202. In some embodiments, event collection engine 202 is configured to add metadata to each obtained event. An example of such metadata can be an identifier associated with the organization for which the event was obtained.

Rules storage 204 is configured to store alerting rules. In some embodiments, each rule stored by rules storage 204 specifies detection conditions that determine when an event is an influencing event (that may eventually lead to an alert) and that therefore, a corresponding new cache entry should be generated to represent the event. In some embodiments, each rule stored by rules storage 204 also specifies an alert generation condition that determines whether the entire set of the queried related cache entries (obtained from detection cache 208) and the new cache entry corresponding to the influencing event should warrant the generation of an alert. In some embodiments, each rule stored by rules storage 204 also specifies a "cooldown period" condition and a timeframe that must have elapsed between related alerts, to be used to determine whether an alert should be generated. In some embodiments, each rule stored by rules storage 204 also specifies a "threshold" and "timeframe" condition, which describes a count of influencing events that must be detected within a timeframe, to be used to determine whether an alert should be generated. Different types of rules stored by rules storage 204 may dictate different conditions for cache entry generation and alert generation.

The following are some specific examples of types of alerting rules that can be stored by rules storage 204:

1) Condition Rules

When a user wants to be alerted on a single action, or specific condition, this can be accomplished with a condition rule. A condition rule causes an alert to be generated in response to the presence of certain conditions in an event. Condition rules are unique in that they stand alone and are evaluated by themselves as to whether the condition exists or not. There is no need to query related cache entries from detection cache 208 to determine if alert generation conditions of the rule are met. For example, a condition rule can dictate to send an alert when a gauge metric above a set value, or when a user has disabled two-factor authentication.

2) Threshold Rules

A threshold rule defines an alert that is raised when influencing events are identified a certain number of times within a specified amount of time. A threshold rule is made up of a condition rule with one or more alert generation conditions: a threshold of how many influencing events that meet the condition are required to trigger an alert, and a timeframe which is the window of time in which the threshold of influencing events must trigger within. When the threshold is one, then the threshold rule becomes a condition rule. However, the threshold can be any number that is one or greater than one. This requires being able to count the previous occurrences of influencing events which matched condition rule component. For example, this is used to detect if a user has five failed login attempts within the past ten minutes. This could also be used, for example, if a sensor has generated more than ten errors in the last minute.

3) State-Change Rules

When an alert is needed based on the evaluated difference between values in two sequential events (e.g., including telemetry data points), a state-change rule can be used. A state-change rule compares the current state of an event to the prior state of an earlier event. State changes when the value was x in the previous telemetry reading and now that value is y. The state-change condition evaluates the difference between the two values/states of two (e.g., adjacently/sequentially occurring) events as f(x,y) using condition functions in the condition rule.

4) Building Block Rules

To create reusable and complex detection rules, detections may be broken down into an ordered list of steps. These "building block rules" may themselves trigger an alert, such as multiple failed login attempts. Any non-sequence rule (e.g., a condition rule, a threshold rule, and/or a state-change rule, such as those described above) may be a building block rule. In some embodiments, a building block rule specifies an alert generation condition, which will also trigger a corresponding cache entry to be added into detection cache 208. In some embodiments, a building block rule may specify an alert generation rule but also specify that the alert should not be sent to an alert destination device (e.g., because that alert cache entry may or may not lead to an alert corresponding to a sequence rule that includes this building block rule). However, since sequence rules are not evaluated in any specific order accounting for sequence dependencies, sequence rules should be avoided as building block rules.

5) Sequence Rules

Multiple building block rules can be combined, in-order, to describe a more complex detection condition. A sequence rule specifies a list of building block rules to describe more complex alerting conditions such as, for example, multiple failed login attempts followed by a successful login from a foreign internet protocol (IP) address. These rules do not have field-level conditions or any detection condition at all. Instead, these rules describe an order of building block rule identifiers, a time window to match all of the building block rules, and any fields necessary to correlate with the previous events. These fields used to correlate must also be in the prior building block rules. The ordered list of building block rules acts as the condition evaluation part of the rule. The cache query stage for a sequence rule is triggered by a member building block rule generating an alert, regardless if that alert is sent to the destination device.

The following is an example description of a "detection condition," which can be one or more cache entry generation conditions that are included in an alert rule: Each rule has conditions which must be satisfied to match the condition evaluation step of the overall detection process. This includes three components, and combined together these are known as a "detection condition":

1. A match operator that must either be any or all—these are also known as the Boolean operators "OR" and "AND", respectively.

And at least one of the following:

2. An optional ordered list of field-level conditions
3. An optional ordered list of nested detection conditions Detection conditions may be nested (item 3, described above), but ultimately, they return a Boolean response to the top-level or first detection condition.

In some embodiments, an alert rule may include Boolean field-level conditions. These conditions are evaluated as either true or false. The operators used here include equal to, greater than, less than, greater than or equal to, less than or equal to, value contains, value is in, and their inverses. Examples include n>=5, n in [1, 2, 3], and n contains "user."

In some embodiments, an alert rule specifies a function. A function is used to change a value or produce a single result from multiple values (such as when a function is used in a state-change rule, as described above). An example function f(x) may be used to translate a geographical location into a region or country. An example function f(x,y) may be used to calculate the distance between two geographical locations identified as x and y, respectively. For example, a function of an alert rule can be applied to portions (e.g., the stored states) of related cache entries and the result/output of the function is then compared to a detection condition (e.g., a Boolean expression) in the alert rule.

Detection engine 206 is configured to receive events for evaluation and compare them against alert rules (e.g., stored in rules storage 204) to perform the first stage ("condition evaluation" stage) of threat detection by determining whether the cache entries should be generated for the events. For example, detection engine 206 is configured to compare the values of the event in the fields specified by the detection conditions (described above) of an alert rule to that condition to determine whether the event is an influencing event and that therefore, a corresponding new cache entry should be generated for it and then stored in detection cache 208. Specifically, detection engine 206 can evaluate all conditions specified in the top-level detection condition and its children against the values of the event and if the top-level detection condition evaluates as true, detection engine 206 generates a new cache entry. In some embodiments, a cache entry that is generated based on an influencing event becomes a representation of the event. In some embodiments, the cache entry corresponding to an influencing event includes a fingerprint that is generated based on at least the rule itself, and may also be based on some field(s) of the event that must match across influencing events and may also be based on some field(s) of the event that must differ across influencing events. As will be described in further detail below, in some embodiments, the field and value pair(s) within the influencing event that match the alert rule are combined, sorted, and deduplicated. Then, a deterministic hash of these values is generated and used as the fingerprint in the cache entry. As such, the fingerprint in the cache entry is derived from the fields of the event that are relevant to the matching alert rule. In some embodiments, in addition to the fingerprint, the cache entry generated for the influencing event may also include one or more of the following: the event timestamp (that was included in the event), a state value (that was included in the event), a universally unique identifier (UUID), and other metadata.

In the event that detection engine 206 determines that an obtained event matches the detection conditions of an alert rule and then generates a new cache entry to store in detection cache 208, then detection engine 206 is also triggered to perform the second stage ("cache query" stage) of threat detection by querying detection cache 208 for a set of related cache entries, which includes the new cache entry (that had already been stored in detection cache 208 prior to the querying). When the cache query stage is triggered, detection engine 206 is configured to check detection cache 208 for previously generated alerts within the defined cooldown period for the alert rule. If the matching alert cache entries match cooldown period criteria (e.g., insufficient time has passed since the last instance of the same alert was sent), then detection engine 206 does continue the cache query stage and does not generate a new alert for that alert rule. Detection engine 206 is configured to use the fingerprint of the new cache entry, and optionally, the alert timeframe and/or threshold conditions, to search detection cache 208 for the set of related cache entries. In some embodiments, the parameters (e.g., the timeframe) of the query to detection cache 208 are determined based on the type of the matching alert rule. Then, detection engine 206 is configured to evaluate the resulting set of related cache entries (inclusive of the new cache entry) against the alert generation conditions of the matching alert rule to determine whether an alert should be generated for that rule.

If the matching alert rule specified a threshold of just one influencing event (the matching alert rule is a condition rule), then detection engine 206 can skip the query of detection cache 208 and proceed directly to the alert generation.

If the matching alert rule is a threshold rule that specified a threshold of influencing events greater than one, then the alert rule must also specify a timeframe interval to evaluate the threshold over. Since the stream of events is not guaranteed to be ordered by time, an accurate timeframe needs to be determined. The timeframe is determined by adapting a Nyquist frequency to the event stream. To determine if the threshold was reached in a single timeframe interval, the query scans entries over a double interval with the event's timestamp of the current influencing event/new cache entry that had matched the alert rule at the center. Ordering in reverse, the query can determine the last cache entry in the results from query, and this is used to determine the real ending timestamp for a calculated timeframe to use for determining actual alert generation. The calculated timeframe is determined by subtracting the rule's defined timeframe interval from the ending timestamp. For threshold rules, detection cache 208 is queried to count the number of matching/related cache entries with the fingerprint of the current influencing event within the calculated timeframe. If the count is greater than or equal to the threshold (the alert generation condition), detection engine 206 proceeds to generate an alert.

If the matching alert rule is a state-change rule, detection engine 206 is configured to query detection cache 208 for the immediately preceding cache entry (as determined based on the event timestamps of the cache entries) within the timeframe. Detection engine 206 is configured to compare the state of the new cache entry against the state of the immediately preceding cache entry within the timeframe to determine whether a difference in the states meets the alert generation condition and if so, detection engine 206 proceeds to generate an alert.

If an alert has been generated for a building block alert rule (e.g., comprising one of a condition rule, a threshold rule, or a state-change rule that is also designated as being a building block alert rule specified), detection engine 206 processes any available sequence rules. Detection engine 206 is configured to query detection cache 208 multiple times in a loop of a shrinking time window to determine whether all building block rules listed in the ordered list of a sequence rule and associated with the current building block alert had been met. If an alert cache entry associated with the last building block rule in the ordered list of building block rules (the cache entry associated with the last generated alert) does not exist in detection cache 208, the query loop stops and does not raise an alert. If the alert cache entry associated with the last building block rule in the ordered list of building block rules does exist in detection cache 208, future iterations look for the prior sequence item (the cache entry associated with the second to last building block listed in the ordered list) to happen in time order prior to the previous. This continues until all sequence items (cache entries associated with alerts generated for building block rules) in the ordered list for the sequence rule have been queried. If all are found, then the alert generation condition of the sequence rule is met, and if all other alert generation conditions such as timeframe are also met, then detection engine 206 generates an alert.

After detection engine 206 generates an alert corresponding to a matched alert rule, as described above, detection engine 206 is configured to determine whether to send the alert to an alert destination device. In some embodiments, detection engine 206 retains cache entries from the "cache query" stage described herein, corresponding to the alert which is generated. If the matching alert cache entries match cooldown period criteria (e.g., insufficient time has passed since the last instance of the same alert was sent), then detection engine 206 does not send the alert. Furthermore, detection engine 206 is configured to generate a cache entry corresponding to the generated alert (e.g., regardless of if it was sent or not to an alert destination device) and store that cache entry in detection cache 208. For example, cache entry corresponding to the alert includes the timestamp of the alert, a deterministic and unique identifier of the alert, and the fingerprint that is included in the cache entries that led/influenced the generation of the alert. The alert cache entry may not contain direct references to the influencing events or their cache entries. This alert cache entry can be used to determine subsequent cooldown period queries and/or used to determine whether alerts had been previously generated for the building block rules of a sequence rule.

Detection cache 208 is a strongly consistent cache and is configured to store cache entries corresponding to, at least, influencing events and alerts that have been previously processed by detection engine 206. In some embodiments, each cache entry stored in detection cache 208 includes a fingerprint (e.g., that represents the corresponding influencing event and the matched rule conditions) and a timestamp. In some embodiments, in addition to a fingerprint and a timestamp, each cache entry may additionally include one or more of the following: a UUID (e.g., event identifier), state values, and other metadata. In some embodiments, detection cache 208 is configured to be capable of sorting and filtering entries by timestamp and hash value. In some embodiments, to keep detection cache 208 small, cache entries expire after a configurable retention period. For example, the retention period can be configured to be 48 hours (e.g., because historically, related events that lead to an alert are obtained by threat detection server 108 within 48 hours). While detection cache 208 is shown to be local/a component of the example threat detection server of FIG. 2, in some other embodiments, detection cache 208 is located separate from and/or remote to the threat detection server and/or shared among multiple threat detection servers.

Figure 3:
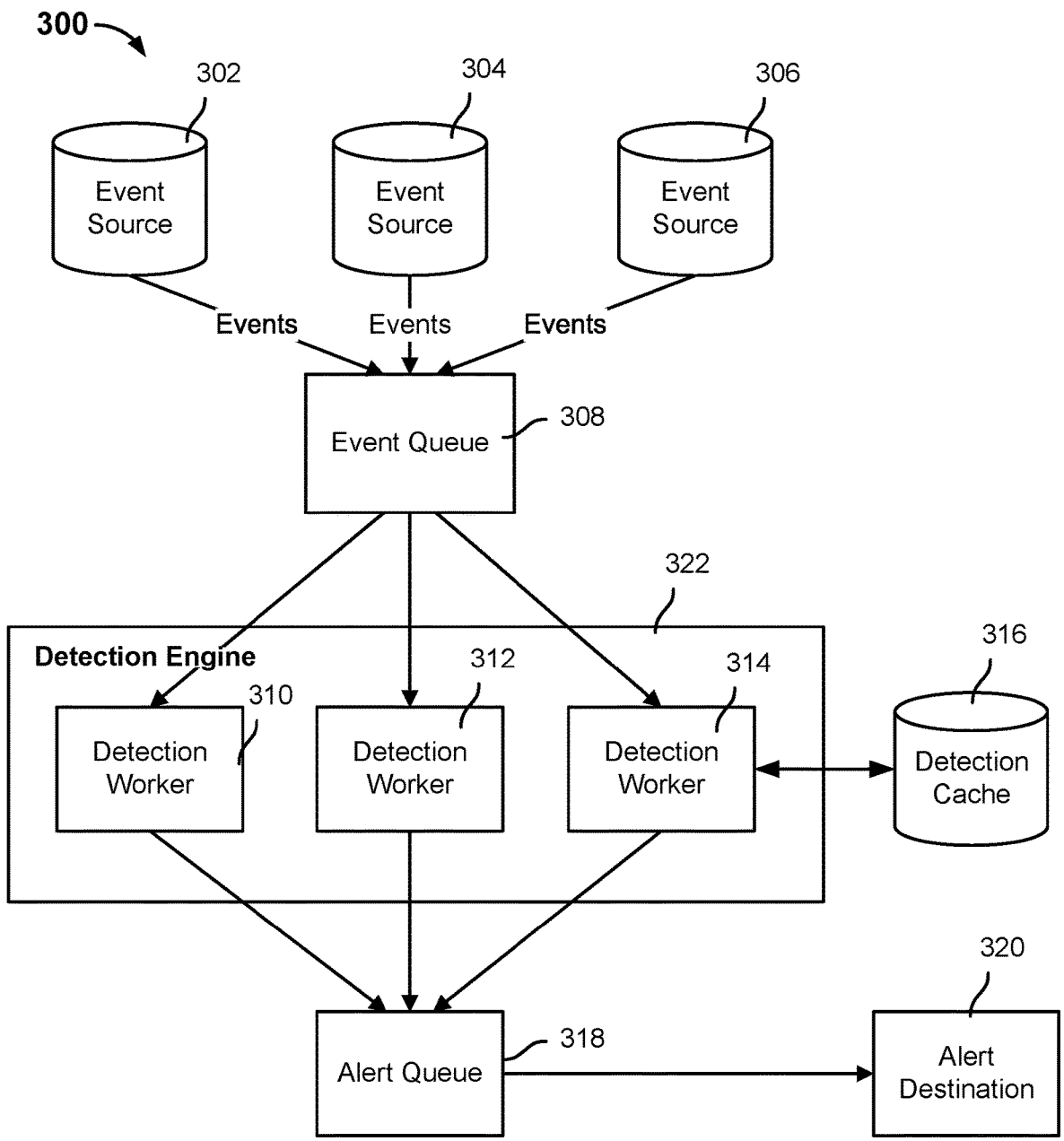
FIG. 3 is a diagram showing a schematic of an example threat detection system.

FIG. 3 is a diagram showing a schematic of an example threat detection system. System 300 shows event sources 302, 304, and 306 generating events that are collected into event queue 308. For example, event sources 302, 304, and 306 are examples of three instances of SaaS platforms that generate events comprising recorded activities and/or sensors/instruments that generate events comprising measured readings/telemetry data. In some embodiments, events that are collected at event queue 308 have been processed (e.g., modified with additional metadata and/or normalized based on a uniform schema). The events from event queue 308 are then obtained by detection workers 310, 312, and 314 of detection engine 322, that are configured to evaluate the events for alert generation, in parallel. Detection workers 310, 312 and 314 are instances of a computer process that is configured to perform event stream-based threat detection in accordance with some embodiments described herein. During the first stage (the "condition evaluation" stage) of threat detection, each of detection workers (computer processes) 310, 312, and 314 is configured to compare the respective event that it is currently evaluating against each of one or more alert rules to determine whether a new cache entry should be generated based on the event and then stored in detection cache 316. In some embodiments, because detection cache 316 is a strongly consistent cache, only one detection worker can store cache entries in the cache at a time (e.g., detection cache 316 is locked during one update to prevent concurrent updates). The new cache entry could include a fingerprint that is generated based at least in part on the rule itself (e.g., a unique rule identifier), and optionally, fields of the event that match the alert rule detection conditions. In the event that at least some of detection workers 310, 312, and 314 determine that the event that it is currently processing did match an alert rule and had generated a cache entry corresponding to that event, those detection workers then proceed to the second stage (the "cache query" stage) of threat detection to query detection cache 316 using the fingerprint of the new cache entry and other parameters (e.g., timeframe) that are determined based on the matching alert rule. The respective set of related cache entries that is queried by a corresponding detection worker is then considered with the alert generation condition of the matching alert rule to determine whether an alert should be generated and/or sent to alert destination 320. In some embodiments, in the event that an alert is generated by the detection worker, the detection worker is configured to store a cache entry corresponding to that alert in detection cache 316. In the event that an alert is generated and also determined to be sent to alert destination 320, the detection worker sends that alert to alert queue 318. Alerts stored in alert queue 318 are configured to be sent serially or in parallel to alert destination 320 (and/or other/multiple alert destinations). For example, alert destination 320 is a client device with a user interface at which the alert can be displayed.

In some embodiments, event queue 308, detection engine 322, detection cache 316, and alert queue 318 may be implemented by a threat detection server such as the example threat detection server that is shown in FIG. 2, above.

Figure 4:
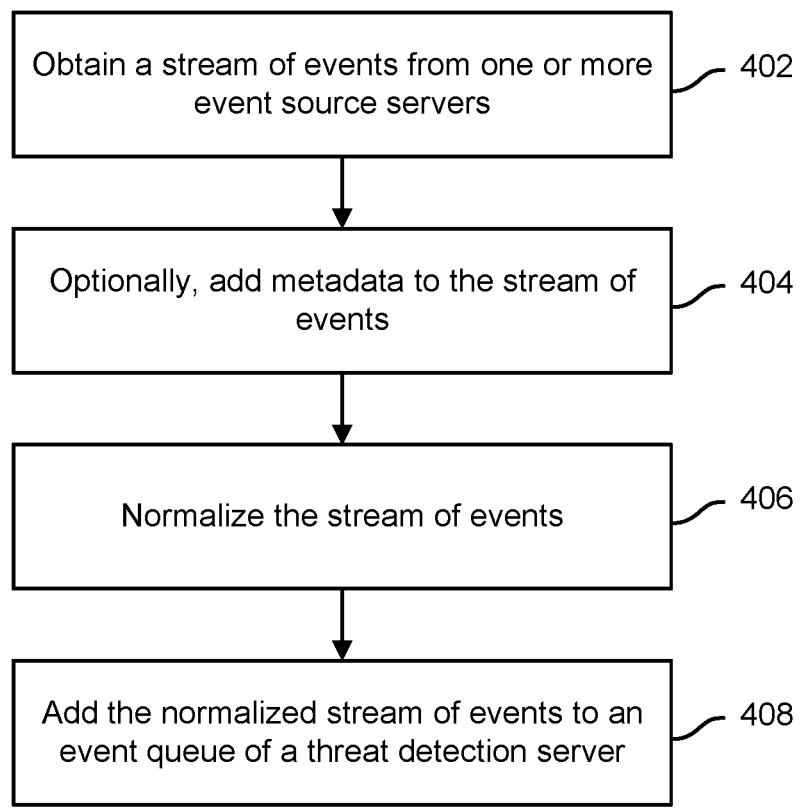
FIG. 4 is a flow diagram showing an example of a process for collecting events from event source servers.

FIG. 4 is a flow diagram showing an example of a process for collecting events from event source servers. In some embodiments, process 400 is implemented at a threat detection server such as threat detection server 108 of system 100 of FIG. 1.

Process 400 shows an example of a process for preprocessing events that are obtained from event source servers before the events are evaluated against alert rules for threat detection.

At 402, a stream of events is obtained from one or more event source servers. For example, the event source servers may be SaaS service servers and/or sensors. In a first example, an event documents an activity with respect to a SaaS service. In a second example, an event documents a measured sensor reading or other telemetry.

At 404, metadata is optionally added to the stream of events. For example, metadata (e.g., that is derived from the field(s) of an event) is added to the event. In a specific example, a customer ID associated with the organization that is denoted in the event is added as metadata to the event.

At 406, the stream of events is normalized. Because the events may be obtained from different event source servers and therefore, may be in different formats or generated based on different (e.g., event source server-specific) schemas, the events can be normalized to a uniform schema so that the normalized events can share a uniform format but maintain their original field values.

At 408, the normalized stream of events is added to an event queue of a threat detection server. The normalized stream of events is then added to an event queue so that detection workers (e.g., computer processes that perform threat detection) can evaluate the events against alert rules.

Figure 5:
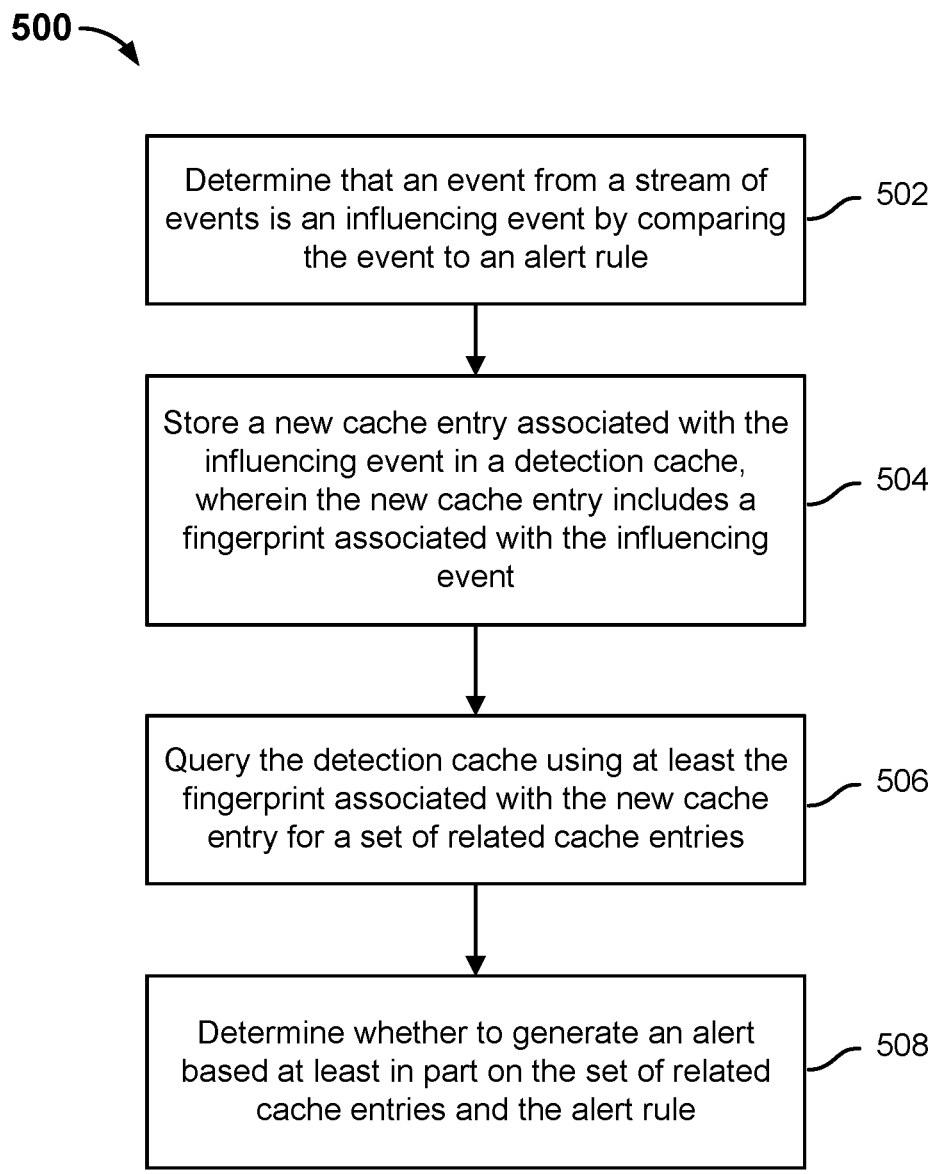

FIG. 5 is a flow diagram showing an embodiment of a process for an event stream-based threat detection. In some embodiments, process 500 is implemented at a threat detection server such as threat detection server 108 of system 100 of FIG. 1.

At 502, an event from a stream of events is determined to be an influencing event by comparing the event to an alert rule. In some embodiments, value(s) corresponding to the event's fields that are compared against a first set of conditions (the detection conditions) of an alert rule. In the event that the condition is matched/satisfied, then the event is considered to be an influencing event that may lead or influence the generation of an alert.

At 504, a new cache entry associated with the influencing event is stored in a detection cache, where the new cache entry includes a fingerprint associated with the influencing event. The new cache entry associated with the influencing event serves as a lightweight representation of the event in the detection cache. The overall contents of the influencing event are not stored by the detection process 500. The new cache entry includes at least the event timestamp that was included in the event and a fingerprint that is generated based on at least the rule itself (e.g., a unique rule identifier), and optionally, some fields that were included in the event and defined in the alert rule. In some embodiments, the fingerprint is a hash of a deterministic combination of at least the fields/field values of the event that had matched the detection conditions of the alert rule. The generated new cache entry is inserted into the detection cache.

Depending on the alert rules that are used, the detection cache stores cache entries corresponding to only a portion of events that are evaluated such that the number of cache entries that are generated based on influencing events is far fewer than the total number of events that have been evaluated. In addition, to minimize the storage space that is used by the detection cache, cache entries in the detection cache expire (and are then removed or marked for removal) after a configurable retention period.

At 506, the detection cache is queried for a set of related cache entries using at least the fingerprint associated with the new cache entry. The fingerprint of the new cache entry is used to query the detection cache for stored related cache entries that share the same fingerprint. In some embodiments, in addition to using the fingerprint of the new cache entry, a timeframe is also used as a query parameter to limit found cache entries to only those that have corresponding timestamps within that timeframe. Events from event source servers often arrive out of order or delayed. In some embodiments, the timeframe window used in the query is determined as the potential sliding timeframe window in which the event exists (beginning, middle, or end) and adjusts the query order the cache entries and use the proper timeframe window. Finding the cache entry corresponding to the first event last or last event first has no impact on the ability to detect the sequence of events based on their respective cache entries, threshold limits, or otherwise determine actual event order. Actual event order is limited by accurate timestamps in the timestamps that are stored with the cache entries. The configured duration of the cache retention limits how far out-of-order events can arrive.

The queried set of related cache entries represents historical events that are related based at least in having matched the detection conditions of the same alert rule. The queried set of related cache entries may include the new cache entry if it had been inserted into the detection cache prior to the query.

At 508, whether to generate an alert is determined based at least in part on the set of related cache entries and the alert rule. The set of related cache entries (which includes the new cache entry) is considered together against the alert generation condition of the alert rule to determine whether an alert should be generated. In some cases, the alert generation criteria will include a cooldown period that will prevent alert generation if its condition is not met/satisfied. In the event that an alert is generated, in some embodiments, a corresponding cache entry to the alert is also inserted into the detection cache. Where an alert is generated, whether it is sent to an alert generation device for display is further determined (e.g., based on whether the alert rule was a building block rule for which an alert should not be sent until the conditions of a corresponding sequence rule have been met).

Figure 6:
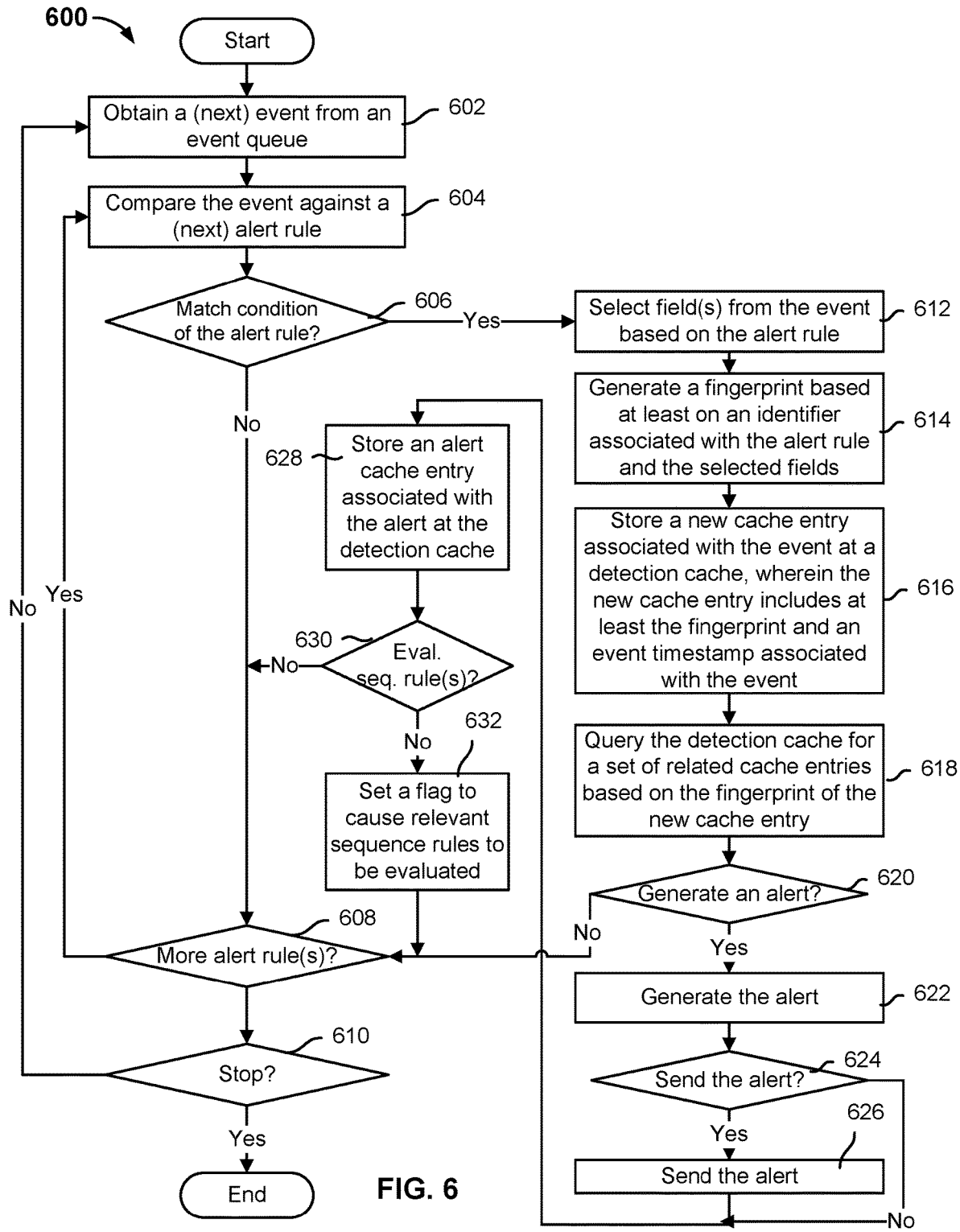
FIG. 6 is a flow diagram showing an example of a process for an event stream-based threat detection.

FIG. 6 is a flow diagram showing an example of a process for an event stream-based threat detection. In some embodiments, process 600 is implemented at a threat detection server such as threat detection server 108 of system 100 of FIG. 1. In some embodiments, process 600 is implemented by a detection worker such as any of detection workers 310, 312, or 314 of FIG. 3. In some embodiments, process 500 of FIG. 5 may be implemented, at least in part, by process 600.

At 602, a (next) event is obtained from an event queue.

At 604, the event is compared against a (next) alert rule. In some embodiments, an event is compared to each alert rule in order by their hierarchy. Any alert rule which is a building block rule or not a sequence rule may be evaluated first. Building block rules must be evaluated before sequence rules as the building block rules themselves act as part of the detection conditions for sequence rules. As such, in some embodiments, condition rules, threshold rules, and state-change rules that may or may not also be building block rules within one or more sequence rules should first be evaluated against the event before any sequence rules. As shown in steps 630 and 632 that are described in further detail below, a flag for the (eventual) evaluation (starting at step 604) of sequence rules against an event is set based on an alert having been generated for a building block rule that is specified in the ordered list of building block rules of any sequence rule.

At 606, it is determined whether the event matches the detection condition(s) of the alert rule. In the event that the event matches the detection condition(s) of the alert rule, control is transferred to 612. Otherwise, in the event that the event does not match the detection condition(s) of the alert rule, control is transferred to 608. As mentioned above, an alert rule specifies detection condition(s) with respect to one or more field values of an event. If those field values of the event match the detection condition(s) of the current alert rule, then the event is an influencing event relative to that alert rule.

At 612, field(s) are selected from the event based on the alert rule. In some embodiments, those field values (e.g., fields and/or their respective values) of the event that match the current alert rule are selected.

At 614, a fingerprint is generated based at least in part on an identifier associated with the rule and the selected fields. In some embodiments, the selected field values in addition to one or more other field values from the event are ordered in a deterministic manner and a hash is generated based on the ordered field values. In some embodiments, an identifier associated with the alert rule is also hashed with the ordered field values. For example, the fingerprint is generated is based on at least the rule itself, and may also be based on some field(s) of the event that must match across influencing events and may also be based on some field(s) of the event that must differ across influencing events.

At 616, a new cache entry associated with the influencing event is stored at a detection cache, wherein the new cache entry includes at least the fingerprint and an event timestamp associated with the influencing event.

At 618, the detection cache is queried for a set of related cache entries based on the fingerprint of the new cache entry and alert generation condition(s) of the alert rule. In response to the new cache entry having been generated for the influencing event, the detection cache is queried for a set of related cache entries that share the same fingerprint as the new cache entry. In some embodiments, the set of related cache entries is also queried based on a timeframe that is determined as a function of the alert rule and also the event timestamp of the new cache entry/current event under evaluation.

At 620, it is determined whether an alert should be generated based on the set of related cache entries and the alert rule. In the event that the alert should be generated, control is transferred to 622. Otherwise, in the event that the alert should not be generated, control is transferred to 608. The obtained set of related cache entries (which includes the new cache entry that was just inserted into the detection cache) is then evaluated against the alert generation condition of the alert rule. If the set of related cache entries meets the alert generation condition of the alert rule, then an alert is generated.

At 622, the alert is generated. The alert is generated to describe, for example, one or more of the following: the matching alert rule, the event source(s) from which the influencing/related events were associated, references to the influencing/related events that lead to the alert obtained from optional metadata in the influencing event cache entries, references to the user(s) that were related to the influencing/related events obtained from optional metadata in the influencing event cache entries, any optional rule-specific metadata (e.g. alert severity and/or alert category).

At 624, it is determined whether the alert should be sent to an alert destination device. In the event that the alert should be sent to an alert destination device, control is transferred to 626. Otherwise, in the event that the alert should not be sent to an alert destination device, control is transferred to 628. In some embodiments, whether the generated alert should be sent to a corresponding alert destination device is determined based on whether a cooldown period had elapsed since the first instance of the same alert or the immediately previous instance of the same alert had been sent. To determine when the first instance of the same alert or the immediately previous instance of the same alert had been sent, the detection cache is queried for cache entries corresponding to alerts associated with the common fingerprint associated with the set of related cache entries. In some embodiments, whether the generated alert should be sent to a corresponding alert destination device is determined based on whether the alert rule is only a building block rule to be later used as part of a sequence rule. For example, the building block rule may include a flag that indicates that an alert should not be sent despite the alert generation condition(s) of the building block rule having been met. For example, if the alert rule is only a building block rule (i.e., alerting is disabled in the alert generation conditions), then the alert that is generated for that building block rule is not sent to the destination device and it is only stored as a cache entry for the alert.

At 626, the alert is sent to the configured destination device.

At 628, an alert cache entry associated with the alert is stored at the detection cache. A cache entry corresponding to the alert is stored at the detection cache to enable subsequent cooldown period evaluations and, in the event that the matching alert rule is a building block rule, facilitate the determination of whether a sequence rule in which the building block rule is included has been met. While step 628 is shown to occur after step 624 in process 600, in actual practice, steps 624 and 628 can be performed at least partially in parallel (e.g., the alert cache entry can be added to the detection cache while simultaneously, it is determined whether the alert should be sent to an alert destination device).

Figure 11:
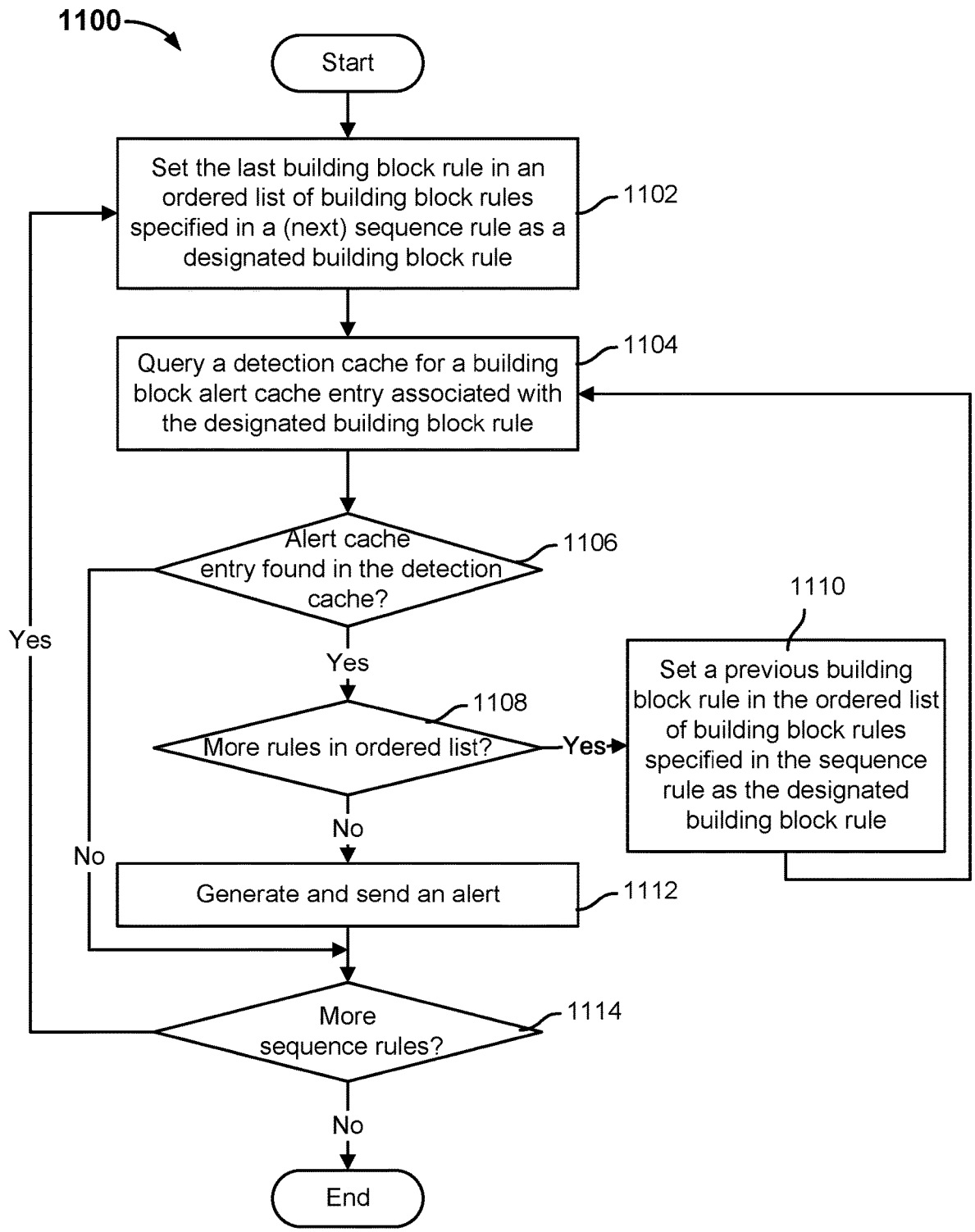
FIG. 11 is a flow diagram showing an example of a process for determining whether to generate an alert for a sequence type of alert rule.

At 630, it is determined whether any sequence rules should be evaluated. In the event that any sequence rules should be evaluated, a control is transferred to 632. In the event that the alert had been generated for a building block rule that is included in the ordered list of at least one sequence rule, the flag is set and control is transferred to 608. Otherwise, in the event that the alert had not been generated for a building block rule that is included in the ordered list of at least one sequence rule, the flag is not set and control is transferred to 608. Whether any sequence rules should be evaluated is determined by checking whether the matching alert rule is defined as a building block rule of a sequence rule. FIG. 11, below, describes an example process of evaluating a sequence rule.

At 632, a flag to cause sequence rules to be evaluated is set. By setting the flag at step 632, evaluation of alert rules against the same event starting step 604 will eventually iterate to processing sequence rules after all other rules are evaluated for that event. Put another way, if an alert corresponding to any building block rule is generated for an event, then that event is eventually compared to sequence rules (which are composed of building block rules).

At 608, it is determined whether there is at least one more alert rule against which to compare the event. In the event that there is at least one more alert rule to compare the event against, control is returned to 604. Otherwise, in the event that there are no more alert rules to compare the event against, control is returned to 602. As mentioned above, condition rules, threshold rules, and state-change rules that may or may not also be building block rules within one or more sequence rules should first be evaluated against the event before any sequence rules and sequence rules are only evaluated against an event if the corresponding flag had been set at step 632.

At 610, it is determined whether to stop event stream-based detection. In the event that event stream-based detection is to be stopped, process 600 ends. Otherwise, in the event that event stream-based detection is not to be stopped, control is returned to step 602. For example, the event stream-based detection can be (e.g., temporarily) paused, suspended, or stopped in response to a user instruction or an exception.

Figure 7:
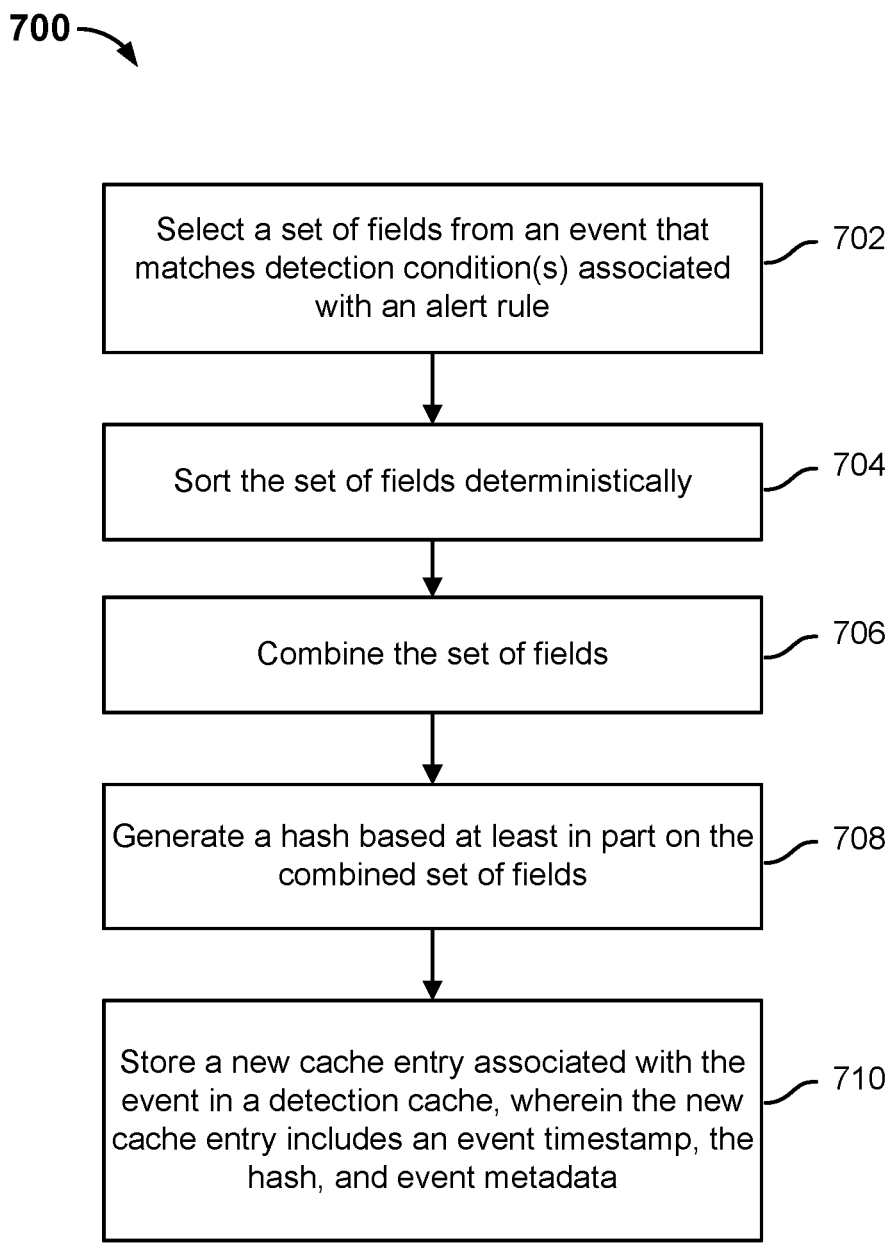
FIG. 7 is a flow diagram showing an example of a process for generating a cache entry to represent an event.

FIG. 7 is a flow diagram showing an example of a process for generating a cache entry to represent an event. In some embodiments, process 700 is implemented at a threat detection server such as threat detection server 108 of system 100 of FIG. 1. In some embodiments, process 700 is implemented by a detection worker such as any of detection workers 310, 312, or 314 of FIG. 3. In some embodiments, steps 612, 614, and 616 of process 600 of FIG. 6 may be implemented, at least in part, by process 700.

At 702, a set of fields is selected from an event that matches detection condition(s) associated with an alert rule. During the first stage (the "condition evaluation" stage) of threat detection, values of fields in an event that are identified by the detection condition(s) associated with an alert rule are compared to those condition(s). In the event that those fields match the detection condition(s), the event is determined to be an influencing event and some fields from the event are selected and the alert rule's identifier are used to generate a new cache entry that is to represent the influencing event in the detection cache (in lieu of storing the actual event data of the event). In some embodiments, certain fields that matched the detection condition(s) of the alert rule are selected from the event and used in the cache entry generation. In some embodiments, one or more alert rule-specified fields (which are sometimes referred to as "detection fields") of the event are also selected. For example, these other fields may be associated with a username so as to distinguish the same activity that is performed or associated with the same user.

For example, the detection conditions of a threshold alert rule are if <action>: "login" and <outcome>: "failure" (which describes an activity associated with a failure to login due to, e.g., wrong credentials or some other authentication failure). Assume that the following event is being compared to the cache entry generation condition of this threshold alert rule:

```
{
    <username>: "alice",
    <action>: "login",
    <outcome>: "failure",
    <state>: "Los Angeles, California"
    <timestamp>: "2021-12-01;02:00"
    <organization>: "ABC_company"
    .....
}
```

In this example, the event matches the detection condition(s) of the threshold alert rule because the value of its <action> field and the value of its <outcome> field match the <action>: "login" and <outcome>: "failure" condition. As such, the fields of "login" and "failure" may be selected for matching the detection condition(s). Alternatively, a unique identifier from the rule metadata may be used in lieu of or in addition to the condition-determined fields. In addition, the value corresponding to the detection field of <username>, "alice," is also selected.

At 704, the set of fields is sorted deterministically. The set of fields is then sorted/ordered deterministically. For example, the predetermined sequence of fields may ordered alphabetically. The selected fields are ordered deterministically so that the resulting hash, as will be described above, will be the same for additional instances of other matching events.

At 706, the set of fields is combined. In some embodiments, the sorted fields and values are combined by being concatenated.

Returning to the example above, the ordered fields may be concatenated to form a value{"action:login: outcome failure:username:alice" }.

At 708, a hash is generated based at least in part on the combined set of fields. A hash is generated by applying a predetermined hash function (e.g., MD5, SHA1) on the combined set of fields. The hash function must be of a sufficient quality to avoid collisions across the volume of events processed and relatively small set of possible input values.

Returning to the example above, the hash is determined as hash("action:login:outcome:failure:username:alice"). While not shown in this example, in some embodiments, the ordered fields and values of an event may also be combined with the identifier of the alert rule and that combination is hashed to form the fingerprint.

At 710, a new cache entry associated with the event is stored in a detection cache, wherein the new cache entry includes an event timestamp, the hash, and event metadata. The new cache entry is generated to include at least the hash as well as a timestamp that was determined based on the timestamp that was originally included in the event. In some embodiments, in addition to the hash and the event timestamp, the cache entry that is generated for an event may also include one or more of the following: an event UUID (e.g., that is generated for the particular event), a state (e.g., which can be assigned based on a corresponding field in the event), and other metadata (e.g., the username associated with the event).

Figure 8:
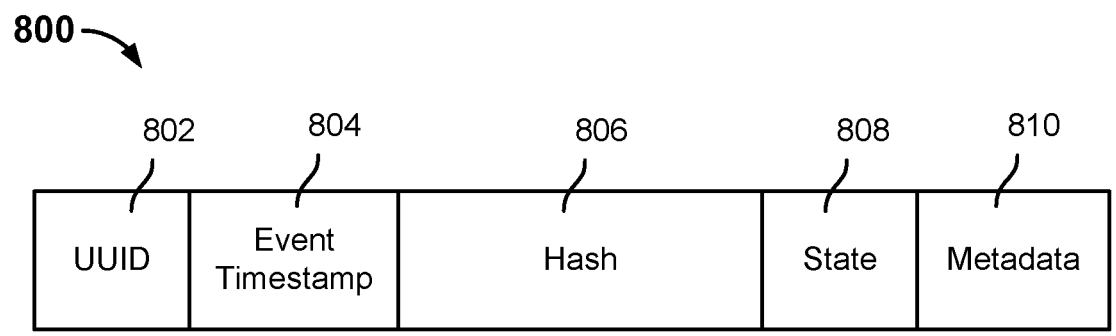
FIG. 8 shows an example layout of a cache entry that has been generated for an event.

FIG. 8 shows an example layout of a cache entry that has been generated for an event. In some embodiments, cache entry 800 can be generated, at least in part, using a process such as process 700 of FIG. 7. As shown in FIG. 8, cache entry 800 includes: UUID 802, event timestamp 804, hash 806, state 808, and metadata 810. While cache entry 800 shows its fields (UUID 802, event timestamp 804, hash 806, state 808, and metadata 810) arranged in a particular order, in actual implementation, a cache entry corresponding to an event may include more or fewer fields and arranged in any other order.

Returning to the example described in FIG. 7, above, the resulting cache entry may have the following fields corresponding to the fields of cache entry 800:

UUID 802: "Event_12345"
Event timestamp 804: "2021-12-01; 02:00"
Hash 806: hash("action:login:outcome:failure:username:alice")
State 808: "Los Angeles, California"
Metadata 810: "ABC_company"

Figure 9:
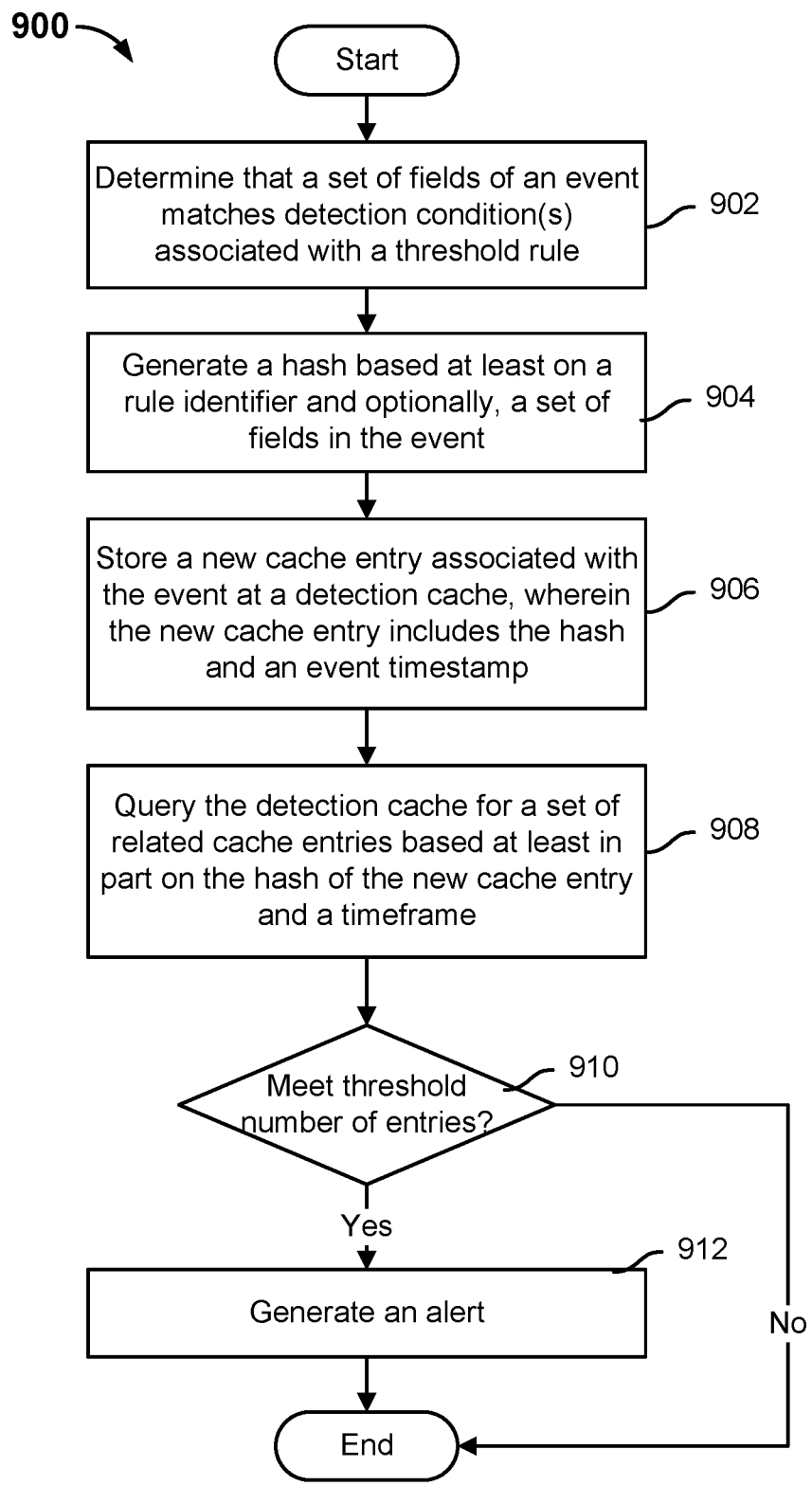
FIG. 9 is a flow diagram showing an example of a process for determining whether to generate an alert for a threshold type of alert rule.

FIG. 9 is a flow diagram showing an example of a process for determining whether to generate an alert for a threshold type of alert rule. In some embodiments, process 900 is implemented at a threat detection server such as threat detection server 108 of system 100 of FIG. 1. In some embodiments, process 900 is implemented by a detection worker such as any of detection workers 310, 312, or 314 of FIG. 3. In some embodiments, steps 612, 614, 616, 618, 620, and 622 of process 600 of FIG. 6 may be implemented, at least in part, by process 900.

At 902, it is determined that a set of fields of an event matches the detection condition(s) associated with a threshold rule. The detection condition(s) of a threshold type of alert rule comprises a set of logical event conditions for a set of fields included in an event.

At 904, a hash is generated based on rule identifier and optionally, a set of fields in the event. A hash is generated based on rule identifier and optionally, a set of fields that matched the detection condition(s) using a process such as, for example, process 700 of FIG. 7.

At 906, a new cache entry associated with the event is stored at a detection cache, wherein the new cache entry includes the hash and an event timestamp. The new cache entry includes the hash and the event's timestamp (e.g., that was determined from the event itself). The new cache entry may include other fields as well, such as shown in example cache entry 800 of FIG. 8.

At 908, the detection cache is queried for a set of related cache entries based at least in part on the hash of the new cache entry and a timeframe. In some embodiments, the timeframe associated with the query is determined based on the type of alert rule, a timeframe specified in the alert rule, and/or by adapting a Nyquist frequency to query of the cache entries from the event stream. For example, the timestamp of the event is used as the center point of time, around which stored cache entries that include the same hash as the new cache entry that have timestamps one timeframe period before and up to the timestamp of the event are found and also stored cache entries that include the same hash as the new cache entry that have timestamps one timeframe period after and up to the timestamp of the event are found. The resulting set of related cache entries includes cache entries that have the same hash as the new cache entry and that also have timestamps that are one timeframe period before and up to one timeframe period after the timestamp of the event. The related cache entries should include the new cache entry if it had been inserted into the detection cache prior to the query. The latest timestamp from the set of cache entries in increasing chronological order is used for a second query. The second query returns the related cache entries that fall within one timeframe before and up to the latest timestamp.

At 910, whether the set of related cache entries meets a threshold number of cache entries is determined. In the event that the set of related cache entries meets a threshold number of cache entries, control is transferred to 912. Otherwise, in the event that the set of related cache entries does not meet the threshold number of cache entries, process 900 ends. The number of cache entries in the set of related cache entries is counted and then compared against the threshold number that is specified in the threshold rule (which is the alert generation condition). If the number of cache entries in the set of related cache entries at least meets the threshold number that is specified in the threshold rule, then an alert corresponding to the threshold rule is generated.

At 912, an alert is generated.

As mentioned in FIG. 7, for example, the detection conditions of a threshold alert rule are if <action>: "login" and <outcome>: "failure" (which describes an activity associated with a failure to login due to, e.g., wrong credentials or some other authentication failure). Assuming that the alert generation condition for the same threshold rule is a threshold of three related cache entries (which represent three discrete events that have matched the detection conditions within the queried timeframe) associated with timestamps within a five minute timeframe, then if at least three related cache entries are found in the detection cache and have timestamps within a five minute timeframe, an alert is generated.

Figure 10:
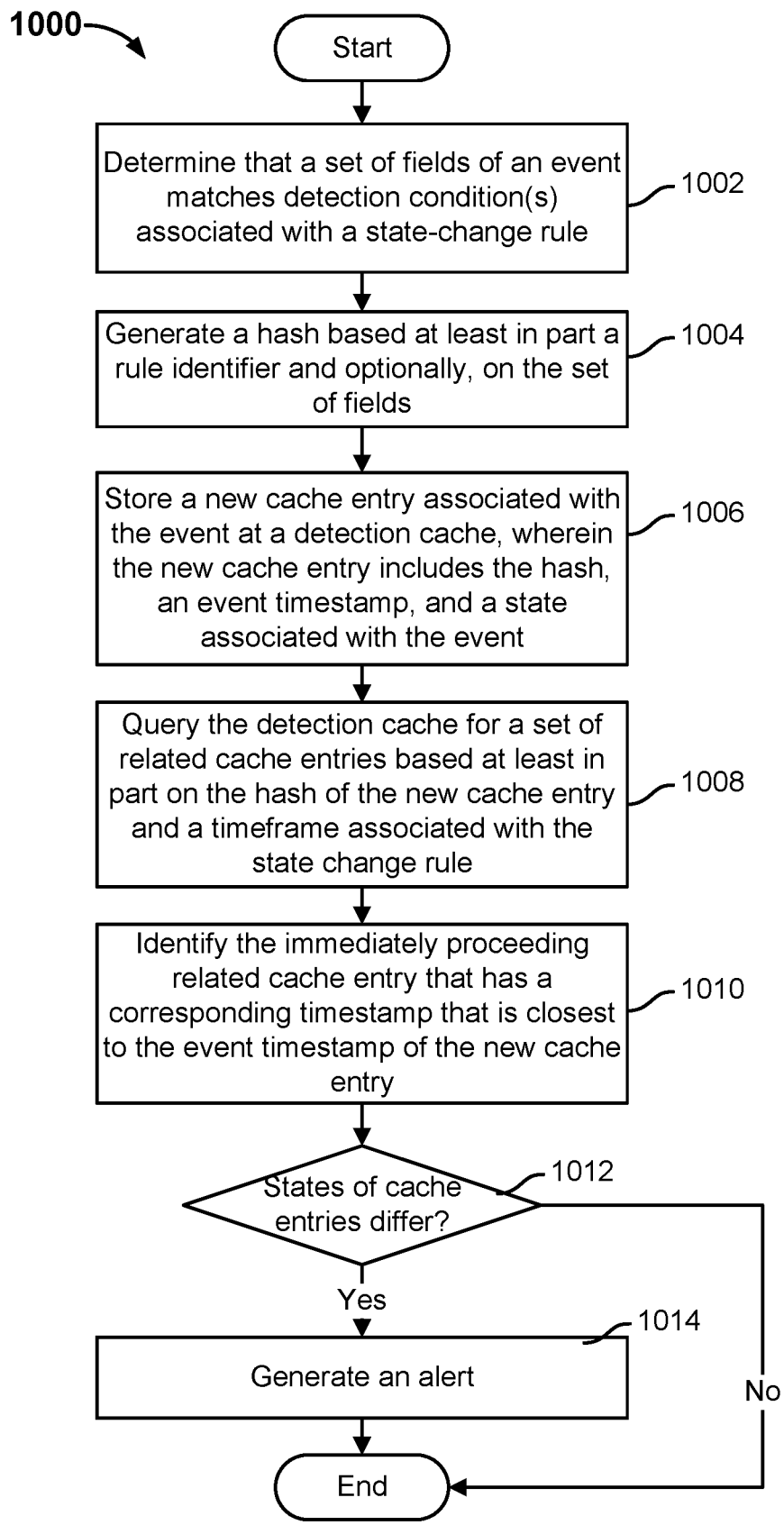
FIG. 10 is a flow diagram showing an example of a process for determining whether to generate an alert for a state-change type of alert rule.

FIG. 10 is a flow diagram showing an example of a process for determining whether to generate an alert for a state-change type of alert rule. In some embodiments, process 1000 is implemented at a threat detection server such as threat detection server 108 of system 100 of FIG. 1. In some embodiments, process 1000 is implemented by a detection worker such as any of detection workers 310, 312, or 314 of FIG. 3. In some embodiments, steps 612, 614, 616, 618, 620, and 622 of process 600 of FIG. 6 may be implemented, at least in part, by process 1000.

At 1002, it is determined that a set of fields of an event matches detection condition(s) associated with a state-change rule. The detection condition(s) of a state-change type of alert rule comprises conditional expression(s) of a set of fields included in an event.

At 1004, a hash is generated based on a rule identifier and optionally, the set of fields in the event. A hash is generated based on rule identifier (from rule metadata) and optionally, a set of fields that matched the detection conditions using a process such as, for example, process 700 of FIG. 7.

At 1006, a new cache entry associated with the event is stored at a detection cache, wherein the new cache entry includes the hash, an event timestamp, and a state associated with the event. The new cache entry includes the hash, the event's timestamp (e.g., that was determined from the event itself), and also a state (e.g., that was determined from a corresponding field in the event itself). The new cache entry may include other fields as well, such as shown in example cache entry 800 of FIG. 8.

At 1008, the detection cache is queried for a set of related cache entries based at least in part on the hash of the new cache entry and a timeframe. In some embodiments, the query searches for one related cache entry immediately preceding the current event timestamp. The query may constrain the search to a specific timeframe (e.g., a predetermined number of hours) prior to the current event.

At 1010, the immediately preceding related cache entry to the event timestamp of the new cache entry is determined. The related cache entries are evaluated and the immediately preceding related cache entry to the event timestamp in the new cache entry is identified. For example, the identified related cache entry and the new cache entry represent two activities that were performed sequentially in time.

At 1012, whether a state of the related cache entry differs from the state of the new cache entry is determined. In the event that the state of the related cache entry differs from the state of the new cache entry, control is transferred to 1014. Otherwise, in the event that the state of the related cache entry does not differ from the state of the new cache entry, process 1000 ends. Because, in the example of process 1000, each cache entry includes a state that was determined from the corresponding event, the state of the related cache entry can be compared to the state of the new cache entry to determine whether there is a difference. For example, the state of the related cache entry and the state of the new cache entry can be input into a designated function that computes a degree of difference between the two states. If the state of the related cache entry and the state of the new cache entry differ greater than a predetermined threshold difference (which is the alert generation condition), then an alert is generated.

At 1014, an alert is generated.

For example, the detection conditions of a state-change alert rule may include the <location> field of an event, corresponding to the location where the action originated, combined with event fields <action>: "login" and <outcome>: "success" fields. The detection conditions may further describe that in the event a login from location X occurs, followed by location Y, a function may be used to calculated the distance between X and Y. The assumption is that the alert generation condition for the same state-change alert rule is two related cache entries that include event timestamps that were sequential in time within a 12-hour timeframe and for which a distance function of their respective <location> field values is a distance greater than a value specified in the alert rule. For example, if the value of the <location> field of an event denoted the geographic location (e.g., the city) from which the login activity was made, then the function in the alert generation condition could compute the distance between the geographic locations that were denoted by the <location> of two sequentially made logins by the same user and determine that if this computed distance were greater than a value specified in the alert rule (meaning that it is very unlikely that the same user could have realistically made these two login attempts), then an alert is generated.

FIG. 11 is a flow diagram showing an example of a process for determining whether to generate an alert for a sequence type of alert rule. In some embodiments, process 1100 is implemented at a threat detection server such as threat detection server 108 of system 100 of FIG. 1. In some embodiments, process 1100 is implemented by a detection worker such as any of detection workers 310, 312, or 314 of FIG. 3. In some embodiments, steps 612, 614, 616, 618, 620, and 622 of process 600 of FIG. 6 may be implemented, at least in part, by process 1100.

Process 1100 describes an example process that describes how evaluating a sequence type of alert rule can prompt multiple queries to the detection cache to verify that each building block rule of the sequence rule had previously been met and also in the chronological order that is specified by the ordered list of building block rules as specified by the sequence rule.

At 1102, the last building block rule in an ordered list of building block rules specified in a (next) sequence rule is set as a designated building block rule. For example, the sequence rule that is currently being evaluated is determined in response to an alert having been generated for one of its building block rules that is included in the ordered list of that sequence rule. As mentioned above, each sequence rule includes an ordered list of two or more building block rules that must be met (e.g., have alerts generated for) in chronological order before an alert can be generated for the sequence rule. As such, to evaluate whether an alert should be generated for the sequence rule, whether an alert for the last building block rule in the ordered list had been generated should be checked first at the detection cache, before whether an alert for the second to the last building block rule in the ordered list had been generated should be checked, and so forth until it is determined that an alert had been generated for the first building block rule in the ordered list had been generated. In process 1100, the building block rule of the ordered list of the sequence rule for which a corresponding alert is being checked at the detection cache is set to the designated building block rule.

At 1104, a detection cache is queried for a building block alert cache entry associated with the designated building block rule. As mentioned above, in some embodiments, when an alert is generated for an alert rule (that may also be a building block rule), a corresponding cache entry is stored at the detection cache. Therefore, if the designated building block rule has been met within the defined timeframe from the sequence rule (e.g., an alert had been previously generated for that building block rule), then a related cache entry should be found in the detection cache. However, if the designated building block rule had not been met within the defined timeframe from the sequence rule (e.g., an alert had not been previously generated for that building block rule), then a related cache entry should not be found in the detection cache.

At 1106, whether the building block alert cache entry associated with the designated building block rule can be found in the detection cache is determined. In the event that the building block alert cache entry associated with the designated building block rule can be found in the detection cache, control is transferred to 1108. Otherwise, in the event that the building block alert cache entry associated with the designated building block rule cannot be found in the detection cache, control is transferred to 1114. In some embodiments, the fingerprint associated with the current event is calculated against each building block rule triggered by the event (each of which has a unique hash/fingerprint for the current event). This fingerprint is used to query the cache for the previously generated alerts.

If the cache entry corresponding to the designated building block rule in the ordered list of the currently evaluated sequence rule cannot be found in the detection cache, then an alert is not generated for the currently evaluated sequence rule and another ("next") sequence rule, if any, is evaluated.

Also, even if the cache entry corresponding to the designated building block rule in the ordered list of the currently evaluated sequence rule can be found in the detection cache, a further check is performed to determine whether the timestamp that is included in the alert's cache entry is earlier than the timestamp that was included in a previous cache entry, if any, that had been queried for a previous building block rule in the ordered list of the currently evaluated sequence rule. For example, one way to determine whether the building block rule's alerts had been generated in order of the list that is included in a sequence rule can be done by multiple sequential queries looking for cache entries with earlier timestamps over and over to determine order. This is because the events associated with the building block rules in the ordered list must have occurred in chronological order in accordance with their position within the ordered list. Otherwise, if the timestamp that is included in the found alert's cache entry is not earlier than the timestamp that was included in the previous cache entry, then an alert is not generated for the currently evaluated sequence rule and another ("next") sequence rule, if any, is evaluated.

At 1108, whether there is at least one more building block rule in the ordered list of the sequence rule is determined. In the event that there is at least one more building block rule in the ordered list of the sequence rule, control is transferred to 1110. Otherwise, in the event that there are no more building block rules in the ordered list of the sequence rule, control is transferred to 1112.

At 1110, a previous building block rule in the ordered list of building block rules specified in the sequence rule is set as the designated building block rule. Until all the building block rules in the ordered list of the currently evaluated sequence rule have been determined to have been met in the reverse order in which they are specified in the sequence rule, an alert for the sequence rule is not generated.

At 1112, an alert is generated and sent.

At 1114, whether there is at least one more sequence rule is determined. In the event that there is at least one more sequence rule, control is returned to 1102. Otherwise, in the event that there are no more sequence rules, process 1100 ends. If there is another sequence rule that includes the met building block rule that had triggered process 1100, then step 1102 is returned to determine whether the last building block rule of the next sequence rule had been met.

For example, assume a building block rule of a threshold type rule has triggered for five failed logins with three minutes. Additionally, one minute later, a building block rule of a condition type rule has triggered for a successful login. A sequence rule may be defined to alert when five failed logins occur withing three minutes, and followed by a successful login for the same user occurs within two minutes of each alert.

Figure 12:
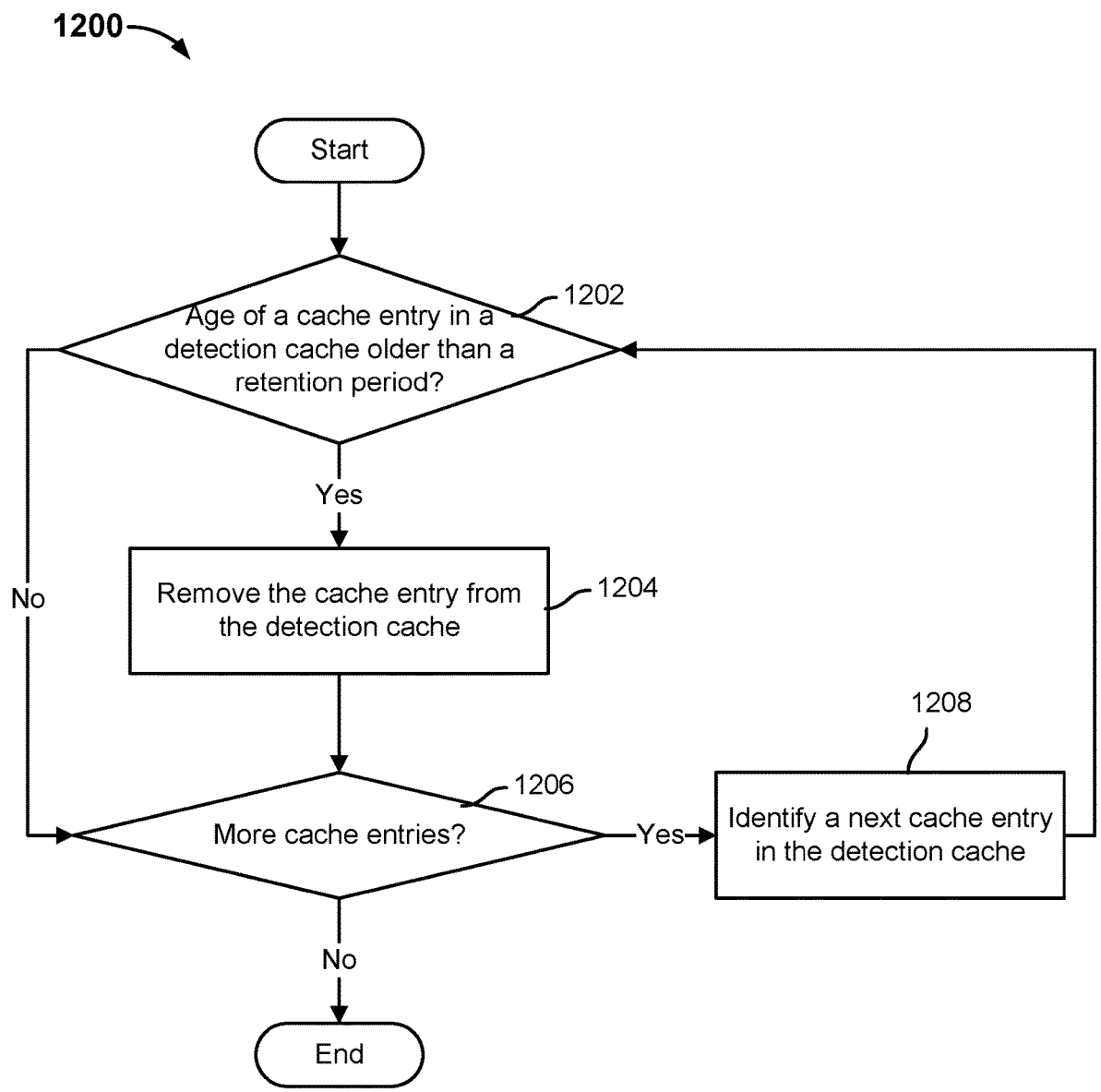
FIG. 12 is a flow diagram showing an example of a process for removing expired cache entries out of the detection cache.

FIG. 12 is a flow diagram showing an example of a process for removing expired cache entries out of the detection cache. In some embodiments, process 1200 is implemented at a threat detection server such as threat detection server 108 of system 100 of FIG. 1. In some embodiments, process 1200 is implemented by a detection worker such as any of detection workers 310, 312, or 314 of FIG. 3.

At 1202, whether an age of a cache entry in a detection cache is older than a retention period is determined. In the event that the age of a cache entry in a detection cache is older than a retention period, control is transferred to 1204. Otherwise, in the event that the age of a cache entry in the detection cache is not older than a retention period, control is transferred to 1206. For example, an age of the cache entry can be determined as the difference between a timestamp that is included in the cache entry and a current time that is maintained for the detection cache. The retention period is a user configurable time period for which a cache entry is permitted to be in the detection cache. The retention period can be longer to derive alerts from a series of related events that arrive at the threat detection server over a longer time window. The retention period can be shorter to reduce the number of cache entries that are maintained in the detection cache at any given time.

At 1204, the cache entry is removed from the detection cache. If the cache entry is older than the retention period, then it is determined to be expired and removed (or at least marked for removal).

At 1206, whether there is at least one more cache entry is determined. In the event that there is at least one more cache entry, control is returned to 1208, where a next cache entry in the detection cache is identified. Otherwise, in the event that there are no more cache entries, process 1200 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  determine that an event from a stream of events is an influencing event by comparing the event to an alert rule;
  generate a new cache entry associated with the influencing event, including to:

select a set of fields from the event based at least in part on the alert rule; and generate a fingerprint associated with the influencing event based at least in part on an alert rule identifier and the set of fields and corresponding field values in the event, wherein to generate the fingerprint based at least in part on the alert rule identifier and the set of fields includes to:

sort the set of fields deterministically;

combine the sorted set of fields, the corresponding field values, and the alert rule identifier into a combined value; and generate a hash based on the combined value;

store the new cache entry associated with the influencing event in a detection cache, wherein the new cache entry includes the fingerprint;

query the detection cache using at least the fingerprint associated with the new cache entry for a set of related cache entries; and determine whether to generate an alert based at least in part on the set of related cache entries and the alert rule; and a memory coupled to the processor and configured to provide the processor with instructions.

2. The system of claim 1, wherein the new cache entry further includes a timestamp associated with the influencing event.

3. The system of claim 2, wherein the set of related cache entries is associated with timestamps that are within a specified timeframe relative to the timestamp associated with the influencing event.

4. The system of claim 1, wherein the alert rule comprises a threshold type alert rule, wherein the processor is further configured to:

determine a number of related cache entries that are included in the set of related cache entries; and in response to a determination that the number of related cache entries meets a threshold value specified in the threshold type alert rule, generate the alert.

5. The system of claim 4, wherein the alert comprises a first alert, wherein the first alert is associated with a first timestamp, and wherein the threshold type alert rule comprises a first building block rule that is included in an ordered list of building block rules in a sequence rule, wherein the processor is further configured to:

query the detection cache to obtain an alert cache entry associated with a second building block rule that is included in the ordered list of building block rules in the sequence rule;

determine a second timestamp associated with the alert cache entry; and determine whether to generate a second alert corresponding to the sequence rule based at least in part on the ordered list of building block rules in the sequence rule, the first timestamp associated with the first alert, and the second timestamp associated with the alert cache entry associated with the second building block rule.

6. The system of claim 1, wherein the alert rule comprises a state-change type alert rule, wherein the processor is further configured to:

determine two related cache entries that include timestamps that are sequential in timestamp;

obtain a function output by applying a function specified in the state-change type alert rule to specified fields in the two related cache entries; and in response to the function output meeting a condition specified in the state-change type alert rule, generate the alert.

7. The system of claim 6, wherein the alert comprises a first alert, wherein the first alert is associated with a first timestamp, and wherein the state-change type alert rule comprises a first building block rule that is included in an ordered list of building block rules in a sequence rule, wherein the processor is further configured to:

query the detection cache to obtain an alert cache entry associated with a second building block rule that is included in the ordered list of building block rules in the sequence rule;

determine a second timestamp associated with the alert cache entry; and determine whether to generate a second alert corresponding to the sequence rule based at least in part on the ordered list of building block rules in the sequence rule, the first timestamp associated with the first alert, and the second timestamp associated with the alert cache entry associated with the second building block rule.

8. The system of claim 1, wherein the processor is further configured to:

generate the alert;

send the alert to an alert destination device; and store an alert cache entry corresponding to the alert in the detection cache.

9. The system of claim 1, wherein the processor is configured to omit storing entire event data associated with the influencing event.

10. The system of claim 1, wherein the detection cache comprises a strongly consistent cache.

11. The system of claim 1, wherein the processor is further configured to:

in response to a determination that cooldown period criteria have not been met, generate the alert.

12. A method, comprising:

determining that an event from a stream of events is an influencing event by comparing the event to an alert rule;

generating a new cache entry associated with the influencing event, including:

selecting a set of fields from the event based at least in part on the alert rule; and generating a fingerprint associated with the influencing event based at least in part on an alert rule identifier and the set of fields and corresponding field values in the event, wherein generating the fingerprint based at least in part on the alert rule identifier and the set of fields includes:

sorting the set of fields deterministically;

combining the sorted set of fields, the corresponding field values, and the alert rule identifier into a combined value; and generating a hash based on the combined value;

storing the new cache entry associated with the influencing event in a detection cache, wherein the new cache entry includes the fingerprint;

querying the detection cache using at least the fingerprint associated with the new cache entry for a set of related cache entries; and determining whether to generate an alert based at least in part on the set of related cache entries and the alert rule.

13. The method of claim 12, wherein the new cache entry further includes a timestamp associated with the influencing event.

14. The method of claim 12, wherein the alert rule comprises a threshold type alert rule, further comprising:
   determining a number of related cache entries that are included in the set of related cache entries; and
   in response to a determination that the number of related cache entries meets a threshold value specified in the threshold type alert rule, generating the alert.

15. The method of claim 12, wherein the alert rule comprises a state-change type alert rule, further comprising:
   determining two related cache entries that include timestamps that are sequential in timestamp;
   obtaining a function output by applying a function specified in the state-change type alert rule to specified fields in the two related cache entries; and
   in response to the function output meeting a condition specified in the state-change type alert rule, generating the alert.

16. A computer program product, the computer program product being embodied in non-transitory computer readable storage medium and comprising computer instructions for:
   determining that an event from a stream of events is an influencing event by comparing the event to an alert rule;
   generating a new cache entry associated with the influencing event, including:
      selecting a set of fields from the event based at least in part on the alert rule; and
      generating a fingerprint associated with the influencing event based at least in part on an alert rule identifier and the set of fields and corresponding field values in the event, wherein generating the fingerprint based at least in part on the alert rule identifier and the set of fields includes:
         sorting the set of fields deterministically;
         combining the sorted set of fields, the corresponding field values, and the alert rule identifier into a combined value; and
         generating a hash based on the combined value;
   storing the new cache entry associated with the influencing event in a detection cache, wherein the new cache entry includes the fingerprint;
   querying the detection cache using at least the fingerprint associated with the new cache entry for a set of related cache entries; and
   determining whether to generate an alert based at least in part on the set of related cache entries and the alert rule.

17. A system, comprising:
   a processor configured to:
      determine that an event from a stream of events is an influencing event by comparing the event to an alert rule;
      store a new cache entry associated with the influencing event in a detection cache, wherein the new cache entry includes a fingerprint associated with the influencing event;
      query the detection cache using at least the fingerprint associated with the new cache entry for a set of related cache entries; and
      determine whether to generate an alert based at least in part on the set of related cache entries and the alert rule, wherein the alert rule comprises a state-change type alert rule, wherein to determine whether to generate the alert includes to:
         determine two related cache entries that include timestamps that are sequential in time;
         obtain a function output by applying a function specified in the state-change type alert rule to specified fields in the two related cache entries; and
         in response to the function output meeting a condition specified in the state-change type alert rule, generate the alert; and
   a memory coupled to the processor and configured to provide the processor with instructions.

18. A method, comprising:
   determining that an event from a stream of events is an influencing event by comparing the event to an alert rule;
   storing a new cache entry associated with the influencing event in a detection cache, wherein the new cache entry includes a fingerprint associated with the influencing event;
   querying the detection cache using at least the fingerprint associated with the new cache entry for a set of related cache entries; and
   determining whether to generate an alert based at least in part on the set of related cache entries and the alert rule, wherein the alert rule comprises a state-change type alert rule, wherein determining whether to generate the alert comprises:
      determining two related cache entries that include timestamps that are sequential in time;
      obtaining a function output by applying a function specified in the state-change type alert rule to specified fields in the two related cache entries; and
      in response to the function output meeting a condition specified in the state-change type alert rule, generating the alert.

19. A computer program product, the computer program product being embodied in non-transitory computer readable storage medium and comprising computer instructions for:
   determining that an event from a stream of events is an influencing event by comparing the event to an alert rule;
   storing a new cache entry associated with the influencing event in a detection cache, wherein the new cache entry includes a fingerprint associated with the influencing event;
   querying the detection cache using at least the fingerprint associated with the new cache entry for a set of related cache entries; and
   determining whether to generate an alert based at least in part on the set of related cache entries and the alert rule, wherein the alert rule comprises a state-change type alert rule, wherein determining whether to generate the alert comprises:
      determining two related cache entries that include timestamps that are sequential in time;
      obtaining a function output by applying a function specified in the state-change type alert rule to specified fields in the two related cache entries; and
      in response to the function output meeting a condition specified in the state-change type alert rule, generating the alert.

* * * * *